Figure 1:
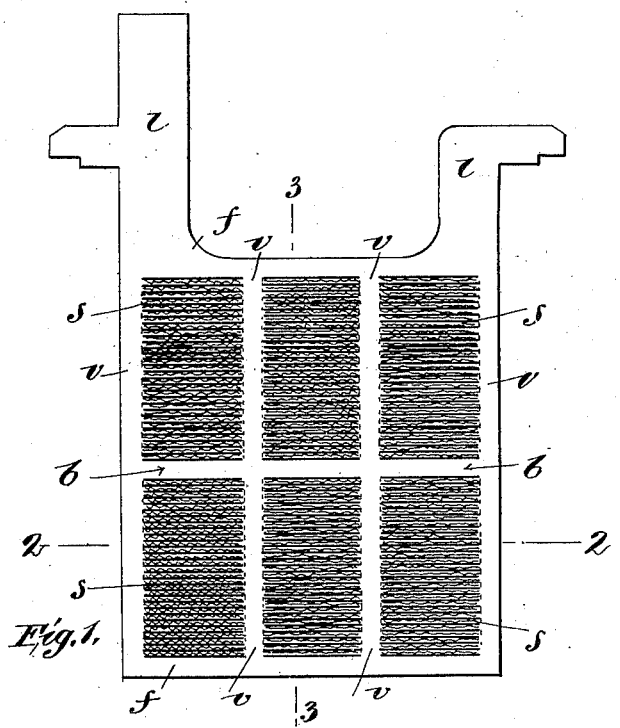

No. 744,895. PATENTED NOV. 24, 1903.
J. BIJUR.
STORAGE BATTERY PLATE.
APPLICATION FILED AUG. 14, 1900.
NO MODEL.

WITNESSES
C. W. Benjamin
Henry S. Morton

INVENTOR
Joseph Bijur, by
ATTY

No. 744,895. Patented November 24, 1903.

UNITED STATES PATENT OFFICE.

JOSEPH BIJUR, OF NEW YORK, N. Y.

STORAGE-BATTERY PLATE.

SPECIFICATION forming part of Letters Patent No. 744,895, dated November 24, 1903.

Application filed August 14, 1900. Serial No. 26,853. (No model.)

*To all whom it may concern:*

Be it known that I, JOSEPH BIJUR, electrical engineer, a citizen of the United States, and a resident of the borough of Manhattan, in the city and State of New York, have invented certain new and useful Improvements in Storage-Battery Plates, of which the following is a description, referring to the accompanying drawings.

The improvement relates particularly to Planté storage batteries or batteries in which the active material is formed out of and upon the lead electrodes by chemical or electrochemical action. It is believed that if this type of battery could be more cheaply manufactured without sacrificing any of its advantages it would be the most perfect form of storage battery for a great variety of uses, if not indeed all uses.

The object of the present invention is to devise such a battery-plate which shall be cheap to manufacture and fulfil all the following requirements: First. The plates to be mechanically strong. Second. The active material, whether peroxid or spongy lead, must be in perfect mechanical and electrical contact with the plate. Third. The active material must be held on surfaces from which it cannot readily fall away. Fourth. The active material must be so disposed that the electrolyte can circulate freely and quickly over every particle of it. Fifth. The surface must be so extensive that for a reasonably large capacity the active material need not be more than about one twenty-fifth of an inch thick. Sixth. The proportion of inactive lead or grid as compared with the active material must be as small as possible. Seventh. The plates must be throughout of pure lead or lead with a small percentage of antimony to give stiffness. Any other metal than lead or lead and antimony—such, for example, as tin-lead solder—is objectionable.

For the purposes of the present specification and claims lead with a small percentage of antimony may be regarded as equivalent to pure lead; but solders of tin or lead, by which it has sometimes been sought to unite the several parts of a plate, is quite inadmissible on account of its electrolytic and corrodible qualities.

Inasmuch as lead plates cannot be cheaply or commercially cut or cast with sufficiently thin and close shelves or divisions extending all the way through the plate and inasmuch as thin lead ribbons soldered together to a supporting-grid are highly objectionable I have considered the possibility of stacking together layers of thin lead ribbon and fusing their ends one by one onto the grid or support by means of a hydrogen flame; but the expense and difficulties of the burning on and of the stacking of the ribbons is impracticable if not prohibitive from a commercial standpoint. I have also considered the possibility of stacking lead ribbons into groups or squares in a mold and then casting the grid about them; but in attempting to carry this out I have found that the melted lead will not fuse the ends of the lead strips and unite with them properly unless it be superheated, and, on the other hand, if superheated it will melt down and destroy the lead strips or ribbons in irregular blotches as it flows past and around them, and in so doing it loses its heat, so that it will not join properly to some ribbons or strips that are not injured or destroyed. I have, however, discovered a process of uniting groups of strips or ribbons of lead to a support of lead, and this new process is claimed in my pending application filed herewith, No. 26,852. I have also produced by this process the battery-plate, which forms the subject of this present application and which I seek to cover, broadly, because conceivably such a plate may be hereafter produced by some other process.

Figure 2:
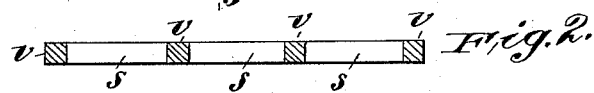
Figure 3:
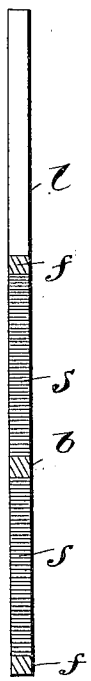
Figure 4:
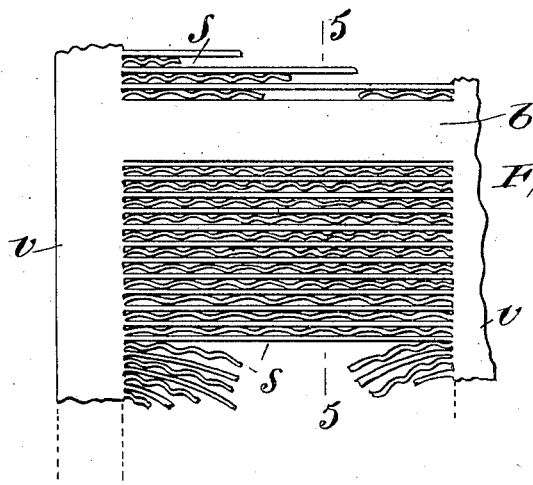
Figure 5:
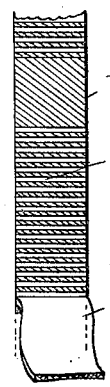
Figures 6, 7:
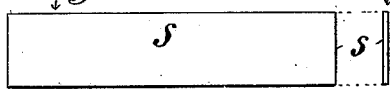

In the accompanying drawings, Figure 1 is a face view of an improved plate which is especially desirable for the positive electrodes of storage batteries. Fig. 2 is a horizontal section on the plane 2 2 of Fig. 1. Fig. 3 is a vertical section on the plane 3 3 of Fig. 1. Fig. 4 is a magnified view of a part of one unit or panel of the plate. Fig. 5 is a vertical section thereof, and Figs. 6 and 7 are face and end views of one of the elementary strips or ribbons of which the units or panels of the plate are formed.

The finished plate is composed of a single homogeneous piece of lead. In this connection I will explain that if portions of the plate have antimony incorporated with the lead the plate may still be regarded as homogeneous and the antimoniated lead as chemically the equivalent of pure lead in the grids. Antimoniated lead has the advantage of being stiffer and less oxidizable under certain conditions than pure lead. The new plate is characterized by panels or groups of minute lead strips or ribbons lying parallel with each other and integrally or autogenously united and merged throughout the whole width of each of their ends into lead ribs or supports of the plate. The electrolyte can circulate freely between strips from one side of the plate to the other. Preferably between the vertical ribs $v$ of the plate are one or more intermediate horizontal bars $b$, and at the top and bottom of the plate are the horizontal members $f$ of the frame of the plate. Any number of squares or panels formed by groups of the ribbons or strips $s$ may be used. In the drawings I have shown a small plate having six panels or squares. Each of these panels or squares may be regarded as a unit composed of the elementary strips or ribbons $s$.

By the term "lead strips" as used in the specification I mean bodies of lead that are broad as compared with their thickness. They are placed one upon another and preferably alternate strips are slightly corrugated in order to insure a slight separation between contiguous strips, and thus permit the free circulation of the electrolyte. The strips are arranged in the plate as shown in the figures, and each strip preferably throughout the entire width of each end merges into and is integrally united with the ribs $v$ of the plate. Consequently the finished plate presents a very great extent of surface upon and out of which the active material can be formed. The strips $s$ form a series of minute slats or shelves entirely separate one from another and of one piece with the ribs $v$ and bars $b$ just as if they had been formed from a solid plate by sawing the slits or interstices through the plate at intervals of about three sixty-fourths of an inch and of a width preferably not exceeding one sixty-fourth of an inch. It is impracticable cheaply or commercially to form such slits by sawing them or by casting the entire plate, and I have produced my plate only by the novel process mentioned above. Briefly stated, this process consists in arranging as many groups of strips $s$ as may be desired, (with or without short bars $b$ of lead of the same length as the strips at intervals in the groups.) The groups are arranged in a mold and heated nearly to the melting temperature of lead. Then melted lead, superheated considerably above the melting-point, preferably at about red heat, is deposited in the intervals to form the ribs $v$, the essential point of the process being that the melted lead is hot enough to fuse the ends of the strips and is preferably deposited directly at the bottom of the intervals or spaces between the groups and the intervals filled up gradually from the bottom upward without permitting the melted lead to flow from one part of the mold to another. This may be accomplished in a crude way by employing an open-sided mold in which the strips $s$ lie upon edge, so that the ribs $v$ will extend horizontally when cast, and the melted lead may then be poured in to form the ribs $v$ in a fine stream or in several fine streams, which deposit the lead throughout the extent of each rib without allowing it to run or flow from one point to another in contact with the ends of the strips $s$. Another way of accomplishing the same result is to use a mold closed on both faces of the plate and then stand the mold upright, so that the ribs $v$ will be vertical, and pour the superheated lead in small carefully-directed streams or through small tubes, which are thrust down in the interval between the groups of strips $s$, so as to deposit the melted lead first at the bottom, and which are gradually withdrawn upward, depositing the melted lead in place without allowing it to flow. These and other ways of carrying out the process are fully set forth in my pending application for the process. The melted and superheated lead gives up its surplus heat to the ends of the strips $s$, which, as above stated, should be heated nearly to the melting-point, so that very little additional heat is required to fuse them. If too much heat is employed, the lead will melt away the ends of the strips very considerably, and to that extent the work will be imperfect; but in following the directions I have given very perfect results will be produced and the joint between the strips and the cast ribs be a perfect joint.

The lugs $l$ may be separately formed and subsequently united to the ribs $v$ and bars $f$ of the plate or they may be cast at the same time with the casting of the ribs $v$.

I have long been well aware of constructions of battery-plates in some of which strips of lead have been mechanically secured in lead grids, in others the lead grid has been cast about and around the edges of strips, while in others strips and ribs have been secured together by fusing or soldering at the exposed surfaces of the plate. These three types of plate bear only a casual resemblance to my new plate, and, indeed, they may be considered as illustrations of the very defects which it is my object to avoid. For example, Starr's patent, No. 290,942, shows a plate composed of minute shelves secured superficially to or embraced by a frame; but this patent gives no instruction nor suggestion of any way by which intermediate ribs between panels of very minute strips can be possibly united autogenously throughout the thickness of the plate so as not to present a fatal weakness at the point of union. Lloyd's patent, No. 612,649, mentions a grid cast around panels of strips, the novelty being the advantageous shape of his strips.

My new plate is a one-piece plate in which the active parts are integral with the supporting-grid, while possessing a minuteness heretofore unattained and in which the joint or union between each strip and the rib to which it is united may be as strong as the strip itself. Such a joint existing in the very center of the thickness of the plate is at this point particularly well protected from corrosion, whereas plates in which the joints are superficially formed are not only weak at the joint, where they should be strongest, but the joints are liable to early destruction by reason of the maximum corrosion taking place on the surface of the plate. Moreover, as already pointed out, when the supports of my new plate are stiffened by the alloying of antimony with the lead I have a lead-antimony grid autogenously united as a one-piece plate with the purer lead strips or other desirable form of active lead. One of the distinguishing characteristics of my new plate resides in the fact that the fusion accompanying the union between the ribs and the strips is substantially equal over the entire length of the intermediate ribs of the frame; but it is apparently entirely novel to have a plate with intermediate ribs (by which term "intermediate" I mean to designate the central portion of the plate as distinguished from its margins, as the word properly implies) autogenously united to fine strips of lead on each side of each rib, the ends of such strips being joined to the ribs throughout their width in contradistinction to being merely soldered at the two surfaces of the plate.

I claim the following:

1. A battery-plate, consisting of a plurality of elements or groups of minutely-spaced strips adapted to become active, and a frame for the plate, the elements and frame being composed of different metals insoluble in sulfuric acid, said frame being provided with ribs intermediate to the said elements or groups, the ends of the strips of the elements being autogenously united to each side of the intermediate ribs by unions lying in the central plane of the plate and thereby existing at the center of the thickness of said ribs in contradistinction to a union existing only at the surfaces of the ribs and at the corners of the ends of the strips, and the fusion accompanying the union between the ribs and the strips being substantially equal over the entire length of the intermediate ribs of the frame.

2. A battery-plate, consisting of a plurality of elements or groups of minutely-spaced strips adapted to become active composed of lead substantially without antimony, and a frame for the plate composed of lead alloyed with and strengthened by antimony, said frame being provided with ribs intermediate to the said elements or groups, the ends of the strips of the elements being autogenously united to each side of the intermediate ribs by unions lying in the central plane of the plate and thereby existing at the center of the thickness of said ribs in contradistinction to a union existing only at the surfaces of the ribs and at the corners of the ends of the strips, the joint or union between each strip and the rib to which it is united being substantially as strong as the strip itself, and the fusion accompanying the union between the ribs and strips being substantially equal over the entire length of the intermediate ribs of the frame, the character of the joints preventing chemical action within the same between the frame and the strips.

Signed this 26th day of June, 1900, at New York, N. Y.

JOSEPH BIJUR.

Witnesses:
HENRY T. MORTON,
EDWARD A. FRESHMAN.